United States Patent [19]
Rolfes et al.

[11] Patent Number: 5,836,236
[45] Date of Patent: Nov. 17, 1998

[54] COFFEE BREWER AND HOT WATER DISPENSER

[76] Inventors: Patrick J. Rolfes, 431 Morning Canyon Rd., Corona Del Mar, Calif. 92704; Paul E. Rolfes, 88 Ocean Vista, Newport Beach, Calif. 92660

[21] Appl. No.: 810,708

[22] Filed: Mar. 3, 1997

[51] Int. Cl.⁶ .................................................. A47J 31/40
[52] U.S. Cl. ............................. 99/290; 99/304; 99/316; 222/146.5
[58] Field of Search ............................. 99/284, 290, 288, 99/323.3, 304, 306, 316; 222/146.2, 146.5, 192

[56] References Cited

U.S. PATENT DOCUMENTS

| | | | |
|---|---|---|---|
| 4,603,620 | 8/1986 | Daugherty | 99/290 X |
| 4,782,744 | 11/1988 | Bunn | 99/290 X |
| 4,927,060 | 5/1990 | Snowball et al. | 222/146.5 |
| 5,285,718 | 2/1994 | Webster et al. | 99/290 |

*Primary Examiner*—Reginald L. Alexander
*Attorney, Agent, or Firm*—Gordon K. Anderson

[57] ABSTRACT

A coffee brewer and hot water dispenser, which includes a brew water tank (30), with water heated to a pre-determined temperature by a pre-heater (38). A boiler (50) boils the pre-heated water into a spray head (56) and into a ground coffee containing cone (114). A separate hot water tank (70) is heated to an adjustable, controlled temperature by a heater (72), and a solenoid valve (74) dispenses the water into a container. Fill, water level dispensing and process control, and indicating are accomplished by the use of a solid state electronic controller (140) interconnected to an indicating control panel (112), producing automatic operation upon manual selection.

19 Claims, 7 Drawing Sheets

COFFEE BREWER AND HOT WATER DISPENSER

TECHNICAL FIELD

The present invention relates to coffee making machines in general. More specifically to the type that receive water and electrical power from an external source and deliver both boiling water for coffee, contained in a filter to a brew pot, and a separate hot water system for food and beverage.

BACKGROUND ART

Previously, many type of coffee brewers have been used in endeavoring to provide an effective means for producing hot water quickly and efficiently for coffee brewing. In most cases, this hot water supply has been limited to brewers utilizing a hot water reservoir that is elevated in temperature to near boiling, providing an appropriate quantity of water to be available for brewing purposes.

Ground coffee is normally contained in a removable filter unit disposed below the outlet of the hot water reservoir. When users wish to brew a pot of coffee, they energize the controls so that cold water from another source enters the reservoir and causes hot water to exit through the ground coffee and the filter into a storage pot located on a warming plate below the filter. The water in the reservoir is then reheated, ready for brewing a subsequent pot of coffee.

It will be noted that many coffee making machines, known in the art, are also equipped with a second outlet faucet, where hot water may be withdrawn from the reservoir without passing through the coffee filter for making tea, hot chocolate, other beverage, or freeze dried soups, etc.

U.S. Pat. No. 5,063,836, issued to Patel, is such a device, however, improved to include level sensing, controlling water inlet flow to the reservoir. A solid state circuit board controls function to particularly accurate temperatures so as to preclude boiling and maintain a constant fill level compensating for evaporation.

In many instances prior art, as well as this forementioned coffee brewer, utilize a glass coffee pot for receiving the brewed coffee and, therefore, require a warming plate. Others, however, employ a vacuum sealed, capped server that maintains the leaving liquid temperatures for long periods of time, eliminating the necessity of a warming plate.

U.S. Pat. No. 5,404,794, issued to Patel et al, is an improvement of the above described prior art and includes a tank heater for maintaining hot water in a partitioned reservoir and, also, a boiler to feed boiling water into the ground coffee contained in the removable filter. This prior art further incorporates a spigot, or external faucet, in communication with the reservoir to allow individual cups, or containers, of hot water to be withdrawn from the same source for various food reconstitution, or so-called instant beverages.

Many other coffee brewers have been developed to incorporate features of level, temperature and dispensing control. The fold is actually replete with both home and commercial coffee brewers of various designs and approaches, however, the need still exists for improvements in automation, safety, and visual indication of the process.

DISCLOSURE OF THE INVENTION

The invention is a culmination of years of experience in the field and, further, the advance in technology using solid state electronics for control and the combined use of two separate tanks, one for brew water, and another for hot water. This combined feature is the primary object of the invention and permits accurate temperature control of each water source, yielding them instantly available in both modes. Hot water is continually obtainable for brewing, as in most devices, however, when hot water for tea, hot chocolate, or the now popular freeze dried soups and other pre-packaged foods is desired, the brewing water tank is not affected. Prior art, using the same tank, requires time to recover, or when small quantities, such as a single cup, is removed the level may not be materially affected, however, this factor may lead to the brewing of a short pot of overly strong coffee on the subsequent operation if insufficient time is not allowed for the fill operation to be completed. Further, coffee is brewed best when the water temperature is 205 degrees F. (98 degrees C.), or as close to boiling as possible, and hot chocolate, tea, etc., is better when the water is slightly lower, approximately 185 degrees F. (85 degrees C.). The instant invention solves this problem by the use of two separate tanks, as hot water may be maintained at this temperature and the quantity is sufficient to permit withdrawal without the necessity of waiting for reheat. In order to provide brew water at the ideal temperature, a separate boiler is employed in conjunction with the brew tank to supply brew water at the boiling temperature in a very short period of time, and the tank may be maintained at a convenient temperature, such as 150 degrees F. (65.6 degrees C.), and the boiler only raises the temperature differential. Maintaining this tank at this particular predetermined temperature is optimum, as electrical energy is not wasted, overcoming the heat loss to atmosphere and, yet, the time interval for brewing is minimized. Further, systems storing water at near boiling temperatures run the risk of boiling over, and the brew is not as tasteful as coffee brewed from boiling water.

Another advantage of this object is the simple volume control. As this invention is directed to the commercial market, a full pot or a half pot may be selected, which makes the task extremely easy and uncomplicated in choosing the amount of ground coffee to use for the brewing process. Conversely, some brewers allow adjustable volume control, making the task difficult to obtain the proper balance and always repeat the ideal combination.

An important object of the invention is the use of a unique and distinctive spray head to introduce boiling water into the filter holding the ground coffee. This new head precludes clogging, due to chemical build-up, as no orifice is used. The head receives boiling water through an inlet elbow and the water impinges on a cone-shaped round diverting disk that is positioned away from the body by a series of extending fingers. A gap formed by this placement continues radially and distributes the water in an even flow through a circular flowpath directly above the coffee, uniformly dispersing the water for optimum contact and brewing.

Another object of the invention is directed to the use of a pair of tanks or reservoirs that are made of a thermoplastic molded into the optimal shape, preferably polyethylene. Tanks are historically made of metal, particularly stainless steel, and while they are functional, they are also expensive to manufacture and difficult to clean. Thermoplastic is an ideal material as it is approved by the Federal Food and Drug Administration for handling food and beverages and is easily molded and easy to clean, as no cracks or sharp corners are employed in its construction. Further, the tanks are vented to atmosphere and, as such, are not pressure vessels and, even though they are connected to city water, no pressure is maintained within the tank.

Still another object of the invention is the use of probes for water level control. The entire control system is based on water level, not time, therefore, partially filled pots and under-temperature water problems are completely eliminated. While the use of metal probes passing a low voltage current through water to measure level is not new, this inventive combination is, indeed, distinctive and eliminated the use of limit switches, floats, etc., common to measuring liquid level. The probes utilized are extremely simple, as they consist of a stainless steel wire rod with an electrical connector crimped on one end. The end of the rod is forced through a hole in the tank which grips the probe securely and permits minor adjustment by simply sliding the probe up or down, as desired. Since no operating components are required, reliability is absolute.

Yet, another object of the invention includes a visual display of the function selected. Indicating lights exhibit the mode of operation, and a beeper momentarily transmits an audio signal announcing a switch has been depressed. Since there are only four switches required, a light in the form of a LED is energized during the functional operation. A light ladder, or series of four lights, one on top of the other in bar style, flash or stay lit, as the brewing function proceeds and then a ready light is energized, indicating the brew cone with its filter and coffee grounds may be removed. A service light indicates heater or boiler over-temperature requiring service and manual reset of the safety switch. An electromagnetic solenoid valve is energized when the hot water switch is depressed dispensing water until the switch is released. A light above the switch indicates this function.

A further object of the invention is the incorporation of a metallic enclosure that is configured to permit sub-assembly of the tanks, heaters, boiler, controller, etc., on a bench. This object permits placing the sub-assembly into the enclosure, attaching with screws, and then adding a top cover to complete the final assembly. This feature is particularly useful in the manufacture of the brewer, as well as for maintenance. All of the components are readily accessible, as removal of the sub-assembly only requires disconnecting two wires, a ribbon cable and one hose, along with the mounting screws.

These and other objects and advantages of the present invention will become apparent from the subsequent detailed description of the preferred and other embodiments, also the appended claims, further taken in conjunction with the accompanying drawings.

BEST MODE FOR CARRYING OUT THE INVENTION

The best mode for carrying out the invention is presented in terms of a preferred and second embodiment. Both embodiments are primarily designed alike, except the second embodiment, or low profile configuration, eliminates the column extension, making the height of the brewer shorter.

The preferred embodiment, as shown in FIGS. 1 and 5 through 26 are comprised of a brew water tank 30 for receiving and storing water for brewing. The tank 30 is illustrated by itself in FIG. 5 and assembled in FIG. 21. This tank is vented to atmosphere and is made of a thermoplastic material, such as butyrate, vinyl, polystyrene, polycarbonate, acetal or urethane, with polyethylene preferred, formed through the rotational molding process. This molding process includes resin loaded into a hollow mold, then rotated simultaneously on two axes while moving through heating and cooling equipment. This tank 30 contains integral connections for the inlet and outlets and communication with a heater, also a thermistor well 32, shown in FIGS. 5 and 9, and five probe recesses 34. The probe recess 34, shown in crosssection in FIG. 7, includes a hole for the probe and, also, a downwardly extending ring 36 surrounding the hole. The ring 36 protects the probe from receiving a false level signal from condensate collected on the inside top of the tank, as water conductivity is employed in the control process and droplets, therefore, fall from the ring isolating the probe. The ground probe does not, however, require this ring 36.

Figures 5, 6, 7, 8, 9, 10, 11, 12, 13, 14, 15, 16, 17, 18, 19:
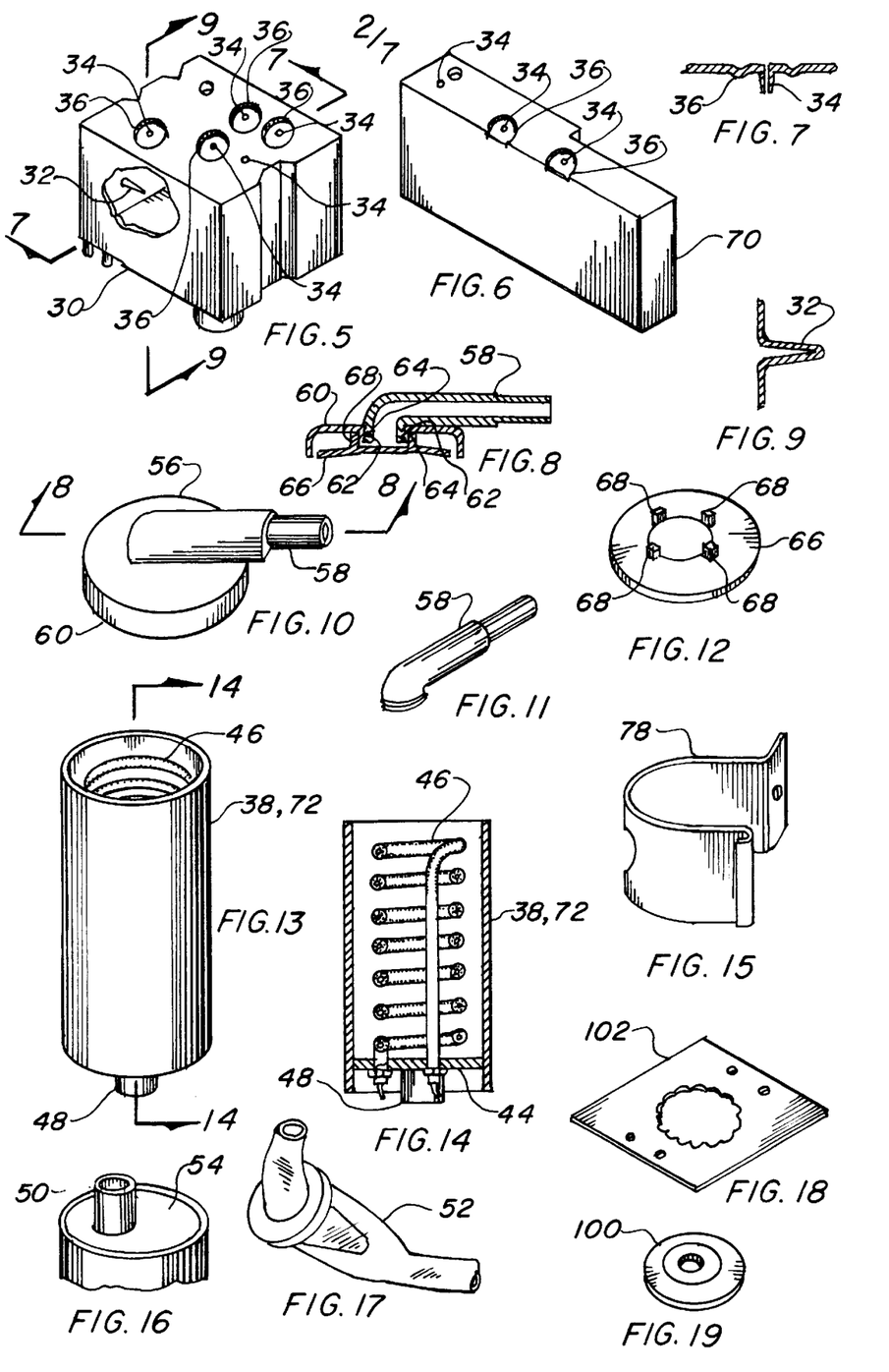
FIG. 5 is a partial isometric view of the brew water tank completely removed from the invention for clarity.
FIG. 6 is a partial isometric view of the hot water tank completely removed from the invention for clarity.
FIG. 7 is a cross-sectional view taken along lines 7—7 of FIG. 5 illustrating the probe recess.
FIG. 8 is a cross-sectional view taken along lines 8—8 of FIG. 10.
FIG. 9 is a cross-sectional view taken along lines 9—9 of FIG. 5 illustrating the thermistor well.
FIG. 10 is a partial isometric view of the assembled spray head completely removed from the invention for clarity.
FIG. 11 is a partial isometric view of the inlet elbow of the spray head completely removed from the invention for clarity.
FIG. 12 is a partial isometric view of the diverting disk of the spray head completely removed from the invention for clarity.
FIG. 13 is a partial isometric view of the brew pre-heater or the identical hot water heater completely removed from the invention for clarity.
FIG. 14 is a cross-sectional view taken along lines 14—14 of FIG. 13 illustrating the heating element and flat bottom inside.
FIG. 15 is a partial isometric view of the heater safety switch bracket completely removed from the invention for clarity.
FIG. 16 is a partial isometric fragmentary view of the brew boiler completely removed from the invention for clarity.
FIG. 17 is a partial isometric view of the check valve completely removed from the invention for clarity.
FIG. 18 is a partial isometric view of the diverting disc, spray head holder retainer completely removed from the invention for clarity.
FIG. 19 is a partial isometric view of the diverting disc, spray head holder completely removed from the invention for clarity.

A brew pre-heater 38 is attached to the brew tank 30 through interconnecting tubing, which is noncontaminating FDA type suitable for food and beverage use. The pre-heater is illustrated in FIGS. 13 and 14 and is made with a hollow metallic tube 42 closed on one end with a metallic flat bottom 44 pressed into the tube in a watertight manner, assuring closure and a hermetic seal. A heating element 46, which is an electrical resistance wire housed in a tubular sheath surrounded by refractory material, is coiled inside the tube 42 and penetrates the bottom 44 with watertight compression of threaded fasteners. The pre-heater 38 also has a fitting in the bottom that communicates with the brew water tank 30 through interconnecting tubing 40, permitting colder water to circulate through the heating element 46 into the tank directly above, using the natural convection principle. A drain connection 48 is also included in the flat bottom 44 that is joined to a drain plug 49 through interconnecting tubing 40 for convenience of draining the water from the tank for maintenance. The pre-heater electrically cycles the heating element 46 on and off to maintain water temperature, within the brew water tank, at 150 degrees F. (65.6 degrees C.), preferably within a 10 degree range.

A brew boiler 50 is mounted under the brew water tank 30 adjacent to the pre-heater 38 and is constructed in much the same manner using an identical metallic tube 42, flat bottom 44 and heating element 46. The boiler 50 utilizes the same drain connection 48 and plug 49, also the fitting in the bottom 44 connected through interconnecting piping 40 to the brew water tank 30. This fluid interconnection, however, contains a check valve 52, shown by itself in FIGS. 17 and 23, in between the tank and boiler, permitting pre-heated water to enter the boiler 50, but disallowing boiling water to re-enter the brew tank. The boiler also differs by having a boiler top 54 pressed into place, as shown in FIG. 16, which includes a fitting to which interconnecting tube 40 delivers boiling water to a spray head 56 under the natural pressure created by contained water during the boil.

The spray head 56, shown assembled in FIGS. 10 and 8, consists of an inlet elbow 58, depicted by itself in FIG. 11, threadably connected to a skirted disc-shaped circular body 60 that includes a raised ring 62 having a groove 64 on the periphery surrounding the elbow entrance. A round cone-shaped diverting disc 66, shown in FIG. 12, having four extending fingers 68 is snapped over the ring 62, intersecting with the groove 64. The size relationship leaves a gap for a flowpath between the body 60 and disc 66. Boiling water is permitted to be evenly distributed over the disc 66 and flow from the spray head 56 through a second gap between the body 60 and disc. This arrangement causes the water to flow in a predetermined circular fashion to the ground coffee below.

Figures 21, 22:
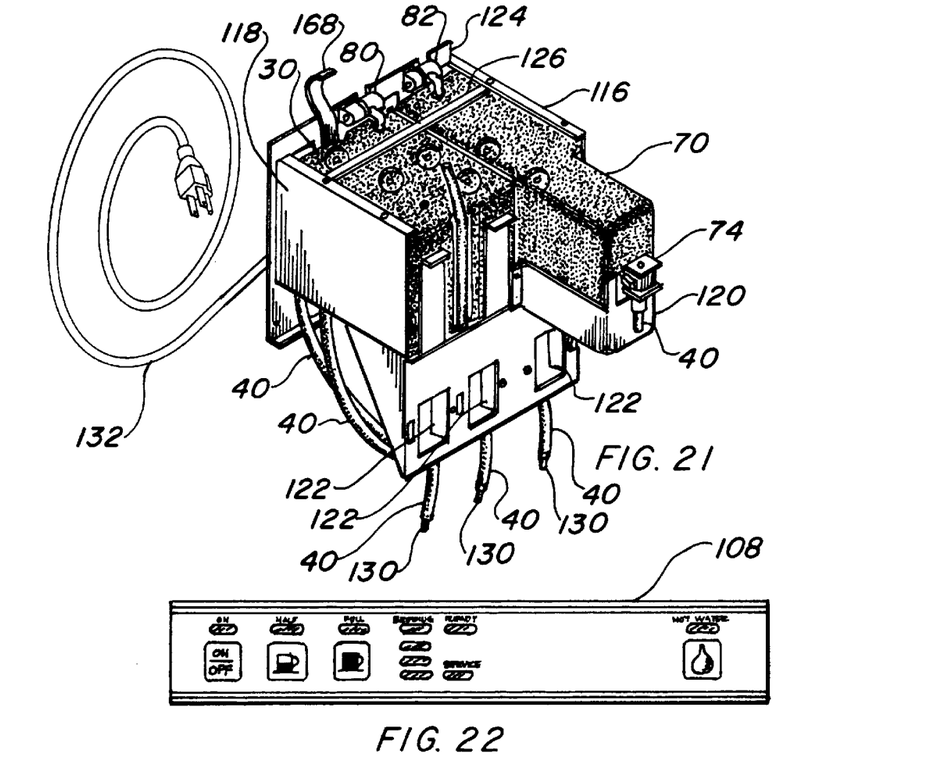
FIG. 21 is a partial isometric view of the completed sub-assembly ready to be inserted into the enclosure.
FIG. 22 is a front view of the control panel decal.

A hot water tank 70, depicted by itself in FIG. 6 and assembled in FIG. 21, of the same basic material and composition as the brew water tank 30, except rectangular in shape and, likewise, receives and stores city water as a reservoir for the hot water system. This system provides hot water for reconstituting freeze dried food and beverages, such as tea and hot chocolate, as previously discussed. The hot water tank 70 is heated by a water heater 72 identical to the pre-heater 38, illustrated in FIG. 13, with the interconnecting tubing 40 attached fluidly to the hot water tank. This heater 72 heats the water to a temperature of 185 degrees F. (85 degrees C.), again within a 10 degrees F. differential, however, this preset temperature may be adjusted, as explained further on in this technical description of the best mode. As with the pre-heater, the water heater 72 electrically cycles the heating element 46 on and off to maintain the pre-set temperature.

The hot water system includes dispensing means in the form of an electromagnetic water dispense solenoid valve 74 that is mechanically attached adjacent to the hot water tank 70 and is fluidly connected directly into the tank. When the dispense solenoid valve 74 is electrically energized, hot water flows into the valve and downwardly through a short section of interconnecting tubing 40 to be received by a cup or container placed underneath.

Figure 23:
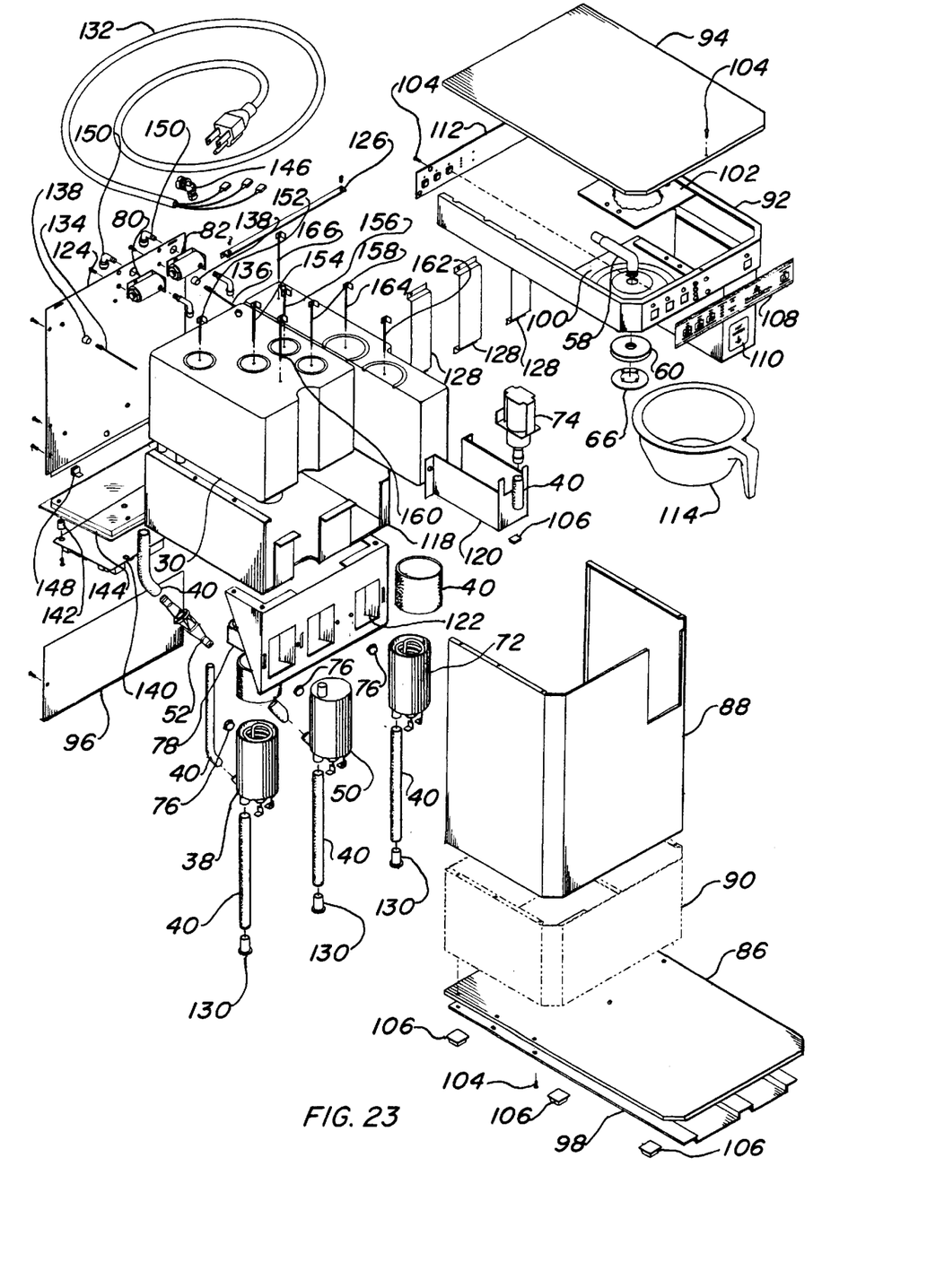
FIG. 23 is an exploded view of the preferred embodiment with the extension column shown dotted.

The brew pre-heater 38, brew boiler 50, and hot water heater 72 each have a safety switch 76 mounted contiguously with a side of the metallic tube 42 using a safety switch bracket 78, as shown in FIG. 23 and by itself in FIG. 15. This positioning places the sensing element of the safety switch 76 in direct contact with the metal of the tube 42 and, in the event that no water is present around the heating element 46, the heat build-up will be sensed by the switch 76 indicating an abnormal overheating condition, permitting shut-down of the electrical system before creating a dangerous condition. Each of the three safety switches 76 are wired in series such that if any one of the switches 76 actuate, the circuit will be deenergized.

An electromagnetic brew fill solenoid valve 80 is positioned at the top of the brew water tank 30 and, when electrically energized, fills the tank with water from the city water supply, which is also connected to valve 80. An electromagnetic water fill solenoid valve 82 is also connected to the city water supply and is mounted on top of the hot water tank 70. This fill solenoid valve 82 operates in the same manner as above, being energized from an electrical signal when the water level is below a predetermined set point.

A novel and very useful feature of the invention, as previously discussed, permits sub-assembly of the operating components into one package that may be removed from the enclosure 84 entirely as a single unit. This construction technique permits the original equipment manufacturer to sub-assemble components, and even test the operation of the brewer and water dispenser prior to final assembly, allowing complete accessibility to all of the components. Further, field repair may be easily accomplished by removing a top cover and lifting the sub-assembly from the enclosure 84 for the same comprehensive access. For removal of the sub-assembly, first, attaching hardware 104 is unscrewed and withdrawn, second, interconnecting tubing 40 is manually disconnected at one intersection by slipping the tube off of the spray head inlet elbow 58, thirdly, two electrical wires are removed from staked terminals, fourthly, a ribbon connector to the control panel is disconnected and, finally, the sub-assembly is then lifted in its entirety from the enclosure. The metallic enclosure 84 provides environmental protection for the coffee brewer and hot water dispenser and adds asthenic value to the apparatus. Basically, the sub-assembly includes major components in the forementioned tanks 30, 70, heaters 38, 72, boiler 50, hot water dispense solenoid valve 74, controls and fill solenoid valves 80 and 82.

Figure 1:
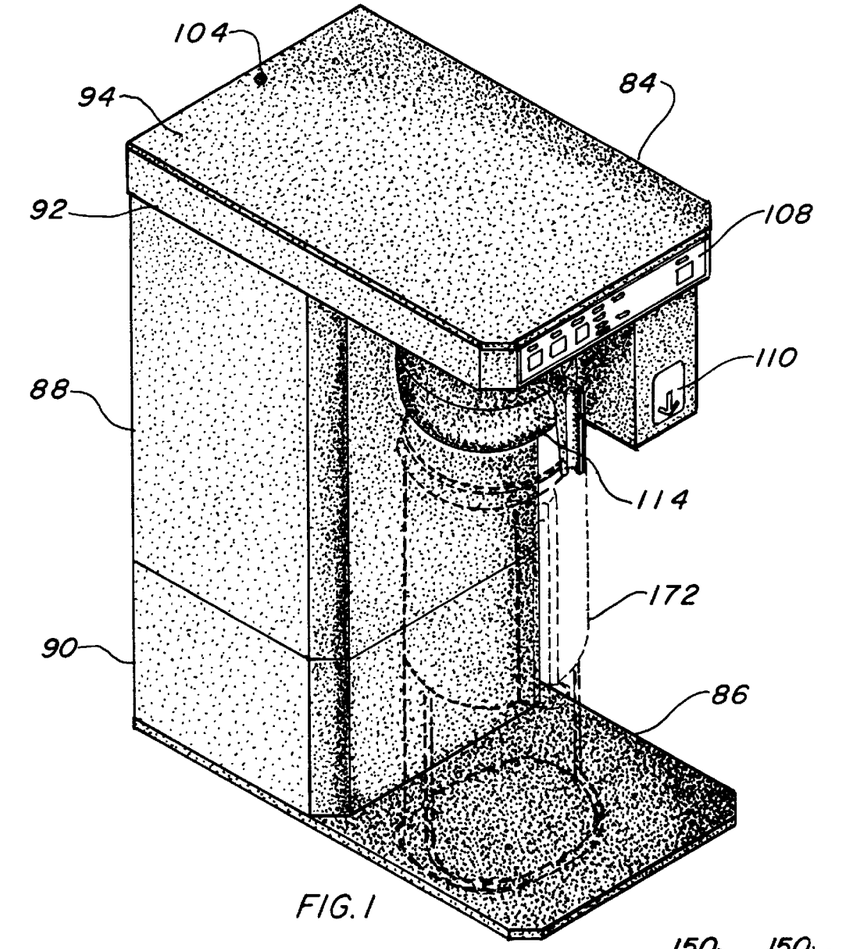
FIG. 1 is a partial isometric view of the preferred embodiment.
Figure 20:
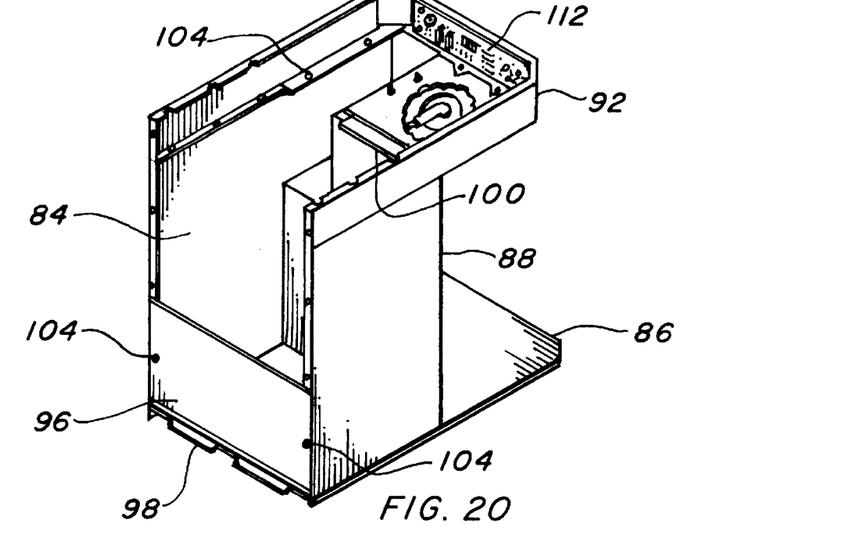
FIG. 20 is a partial isometric view of the empty assembled enclosure.

FIG. 20 illustrates the empty assembled enclosure 84, which incorporates the base 86 and column 88. It will be noted that an extension column 90 is illustrated in FIG. 1 for the preferred embodiment. The enclosure 84 further consists of a top housing 92, a top cover 94, shown only in FIGS. 1 through 4, a lower back plate 96, base stiffener 98, spray head holder 100, depicted in FIG. 19, spray head holder retainer 102, depicted in FIG. 18, spray head 56 and attaching hardware 104. Other parts of the enclosure 84 are illustrated in FIG. 23 and include additional attaching hardware 104, resilient feet 106, control panel decal 108, depicted by itself in FIG. 22, hot water decal 110, indicating control panel 112, and the coffee brew cone 114, that is removably attached to the bottom of the spray head holder 100.

The complete sub-assembly 116 is shown removed from the invention in FIG. 21 and includes the following; tank retaining housing 118, hot water tank retaining bracket 120, brew water tank 30, hot water tank 70, heater and boiler bracket 122, upper back plate 124, tank retaining angle 126, and three separate tank retainer mounting brackets 128 that attach the retaining bracket 120 to the back plate 124. Other components within the sub-assembly include tubing 40, three separate drain plugs 130, water dispense solenoid valve 74, water fill solenoid valve 82, brew fill solenoid valve 80, and a power cord 132, most of which have been previously discussed and individually described. Other parts of the sub-assembly 116 are illustrated in the exploded view of FIG. 23 and include the check valve 52, safety switches 76 with their brackets 78, both previously discussed, as well as individually described. A brew thermistor 134 and water thermistor 136 are inserted into the thermistor well 32 of their respective tanks 30 and 70, and held in place with a resilient thermistor plug 138. An electronic controller 140, in the form of a printed circuit board, is mounted beneath the tank retaining housing 118 on four stand-off spacers 142, with attaching hardware 104, and protected by a thermoplastic printed circuit board shield 144. A cord strain relief 146, ground clip 148, and two water inlet compression fittings 150 are included in this sub-assembly. To control water level, the following probes are used in the sub-assembly and are constructed of stainless steel sharpened on one end and cut to length as described and tabulated below:

| Element No. | Description | Color Designation | Lgth. (In.) | Lgth. (CM) |
| --- | --- | --- | --- | --- |
| 152 | brew fill probe | blue | 1.38 | 3.50 |
| 154 | brew 25 oz. probe | brown | 2.12 | 5.40 |
| 156 | brew 50 oz. probe | yellow | 2.88 | 7.30 |
| 158 | brew 75 oz. probe | red | 3.88 | 9.84 |
| 160 | brew ground probe | green | 4.38 | 11.11 |
| 162 | water fill probe | violet | 1.38 | 3.50 |
| 164 | water safety probe | black | 2.88 | 7.30 |
| 166 | water ground probe | green | 4.38 | 11.11 |

The logic, control and indication is accomplished by the use of a solid state electronic controller 140 interconnected to a solid state indicating control panel 112, both constructed on printed circuit boards. The interconnection is accomplished by a ribbon cable 168 with terminating connectors and two individual wires leading to the heater safety circuit. The above controller 140 regulates both the brew water and hot water fill, level, temperature, and dispensing. The control panel indicates process and contains selection means in the form of touch pad switches, permitting the user to select on/off function, half or full pot brew levels and hot water dispense. Further, the panel permits the user to view brewing progress intervals, indication when it is safe to remove the coffee containing brew cone, view heater malfunction and indication of hot water dispensing. The indication is accomplished by light emitting diodes (LED's) mounted on the board behind the top housing 92 generating light projected through holes at appropriate locations and transparent areas of the control panel decal 108.

Figure 24:
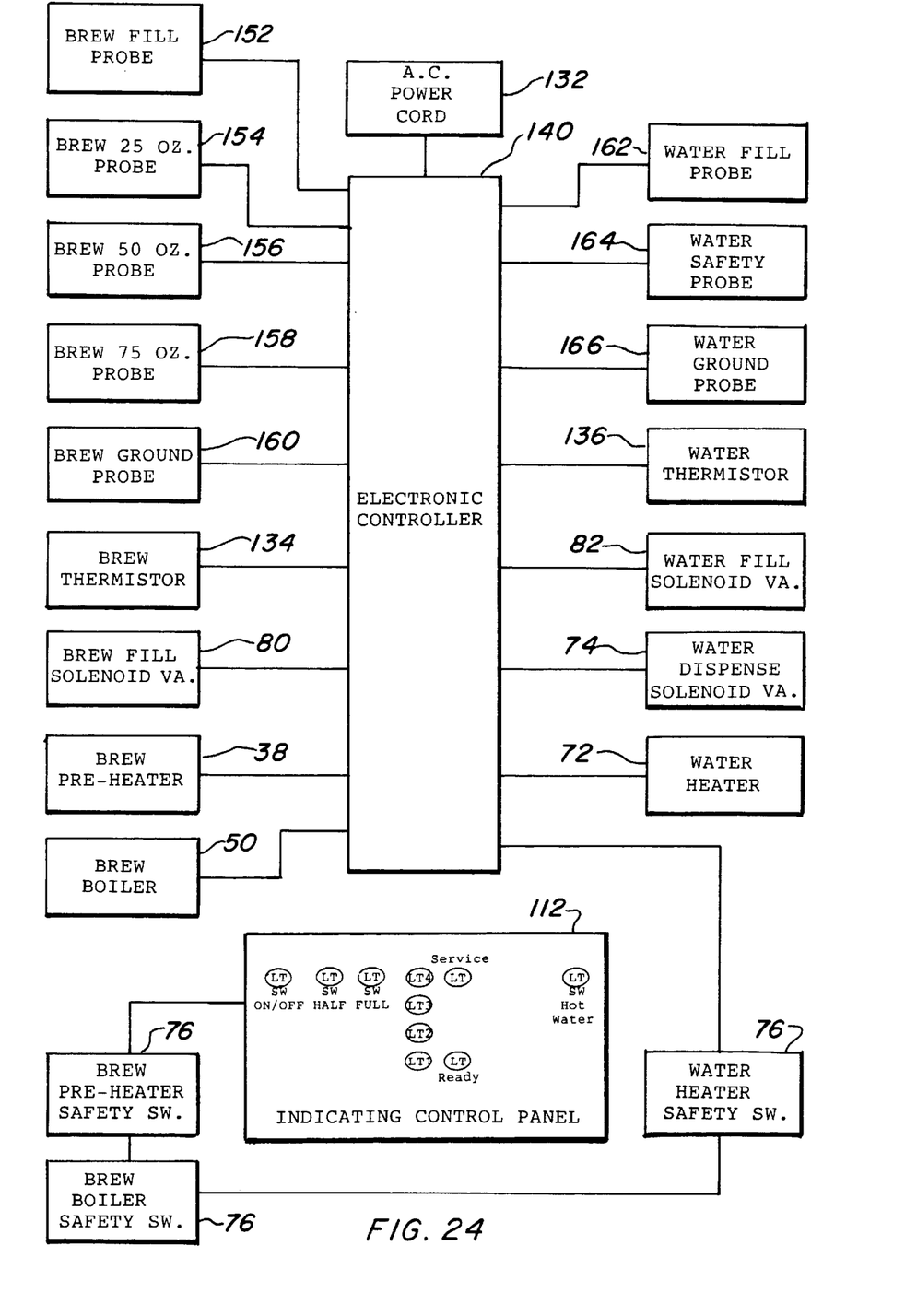
FIG. 24 is a block diagram of the preferred embodiment electrical system.
Figure 25:
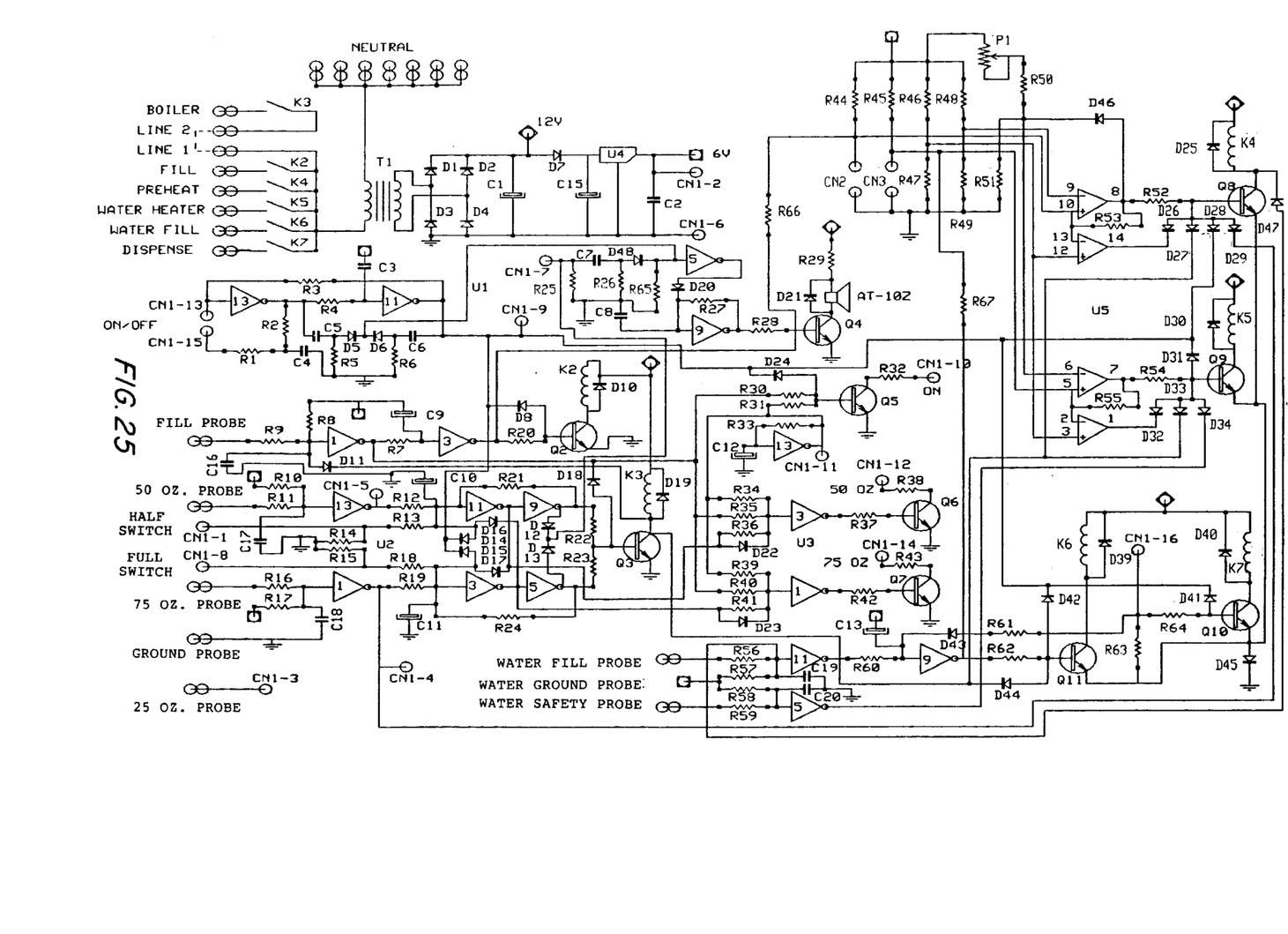
FIG. 25A is the first half of an electrical schematic of the electronic controller with all interconnecting lines marked with alpha reference letters.
FIG. 25B is the second half of the electrical schematic of the electronic controller, with the interconnecting lines marked with alpha reference letters.

The electronic controller 140 is illustrated schematically in FIG. 25 and in a block diagram in FIG. 24, where the attached peripheral elements of output and input are diagrammatically represented. There are basically eight separate, and yet, completely interrelated circuits. These circuits are designated as follows:

a) power supply circuit
b) enable circuit
c) brew fill, level and dispense circuit
d) hot water fill, level and dispense circuit
e) brew water temperature control circuit
f) hot water temperature control circuit
g) hot water dispensing circuit
h) visual and audio indicating circuit The power supply circuit provides 120 volt single phase 60 hertz power through designated relays mounted on the printed circuit board of the controller 140 to components listed below.

| Relay | Description | Element No. |
| --- | --- | --- |
| K2 | brew fill solenoid valve | 80 |
| K3 | brew boiler | 50 |
| K4 | brew heater | 38 |
| K5 | water heater | 72 |
| K6 | water fill solenoid valve | 82 |
| K7 | water dispense valve | 74 |

A neutral bar provides the second leg of the single phase city power to the operating component. It will be noted that relay K3 for energizing the brew boiler 50 is, further, connected in series through line 1 and line 2. Transformer T1 receives 120 volt AC power and reduces this voltage, which is immediately applied to a full wave direct current rectifying bridge consisting of diodes D1 through D4 and then filtered by capacitor C1. The filtered output is then fed to 12 volt DC supply pin 12V, as well as through diode D7 to capacitor C15 and on to a 6 volt DC regulator U4. The regulator U4 provides a constant 6 volt DC power supply to pins 6V and CN1-2 and is oriented by a ground connection. Capacitor C15 stores energy, allowing the regulator U4 to maintain output in the event of transients on the input line. Capacitor C2 couples the supply pins CN1-6 to ground and is used for high frequency bypass on supply pins 6V and CN1-2. The power supply circuit, as described above, provides high voltage power for operating components and, also, both 12 volt full wave rectified direct current power and 6 volt DC for lights and controls within the controller 140 and control panel 112.

The enable circuit in the controller 140 is energized by an on/off switch in the control panel 112 through contacts CN1-13 and CN1-15 directed through the ribbon cable 168. 6 volt power is supplied through capacitor C3 to the input of integrated circuit U1 pin 11 and through resistor R4 to the output of integrated circuit U1 pin 13, also through resistor R2 and R1 to switch pin CN1-15. Resistors R1 and R2 are also connected to capacitor C4 and ground. This ground is connected via resistor R5 to the anode side of diode D5 and through capacitor C5 to the output of integrated circuit U1 pin 13. The cathode side of diode D5 is connected to the cathode side of diode D6 and to the input of integrated circuit U1 pin 5 supplying an operational signal for the audio indicating circuit. Pin CN1-13, in electrical communication with the on/off switch on the indicating control panel 112, is connected to the input of integrated circuit U1 pin 13 and through resistor R3 to the output of integrated circuit U1 pin 11. The output of integrated circuit 11 is also connected via capacitor C6 to the anode of diode D6 and through resistor R6 to ground. Further, the output of integrated circuit U1 pin 11 is also connected to pin CN1-9 and the balance of the separate functional control circuits, previously described, to enable their operation when the on/off switch is energized on the control panel 112.

The brew fill, level and dispense circuit utilizes metallic probes and the conductivity of the water contained within the tank 30 passing a low voltage DC current to ground for continuity indicating the water level. 6 volt DC power is introduced from the 6 volt DC pin to the brew fill probe 152 through voltage dropping resistors R8 and R9 in series. Resistor R8, also electrically communicates with the input of integrated circuit U1 pin 1, the anode of diode D11 and via capacitor C16 to ground. The 6 volt DC power input, also communicates with the input of integrated circuit U1 pin 3 via capacitor C9 and through resistor R7 to the output of integrated circuit U1 pin 1. The output of integrated circuit U1 pin 3 is connected to the base of transistor Q2 through resistor R20. This base connection is also fed to the anode of diode D8. The emitter of transistor Q2 is attached to ground, and the collector is connected to a first side of the holding coil of brew fill solenoid valve relay K2 and, also, to the anode of diode D10. The second side of the K2 relay holding coil is connected to the cathode of diode D10 and the 12 volt DC power pin.

6 volt DC power is introduced from the 6 volt pin to the brew 50 oz. probe through voltage dropping resistors R10 and R11 in series. Resistor R10, also electrically communicates with the input of integrated circuit U2 pin 13 and ground, through capacitor C17. Ground, through capacitor C10, is connected to the input of integrated circuit U2 pin 11 and via resistor R12 to the output of integrated circuit U2 pin 13 and pin CN1-5. The input of integrated circuit U2 pin 11 is connected through resistor R21 to the output of integrated circuit U2 pin 9 with the input, also in communication with the output of integrated circuit U1 pin 11. The output of integrated circuit U2 pin 9 leads to the cathode of diode D12 and through resistor R22 to the anode of diode D18 and, also the base of transistor Q3. The emitter of transistor Q3 is grounded and the collector extends to the anode of diode D19 and the cathode of diode D11, as well as the first side or ground of the holding coil for relay K3. The second side of the K3 coil is connected to the 12 volt DC power pin and the cathode of diode D19. K3 energizes the brew boiler 50 when the function is called for by the controls, energizing half or full switch at the control panel 112.

The brew 75oz. probe receives 6 volt DC power from the 6V pin through R17 and R16 in series. The input of integrated circuit U2 pin 1 is connected between resistors R16 and R17 and communicates to ground and the brew ground probe 160 through capacitor C18. The output of integrated circuit U2 pin 1 is directed to pin CN1-4 and through resistor R19 to the input of integrated circuit U2 pin 3 and through capacitor C11 to ground. The intersection of the input of integrated circuit U2 pin 3, R19 and C11 is connected to the output of integrated circuit U2 pin 5 through resistor R24, which output is also connected to the anode of diode D13 and to the base of transistor Q3 through resistor R23. The input of integrated circuit U2 pin 3 is also connected through resistor R18 to pin CN1-8, which is also connected to ground through resistor R15 and the "Full" switch located on control panel 112. The input U2 pin 3 is also connected to the anodes of D17 and D15. The cathode of diode D17 is connected to U2 pin 11 output and the cathode of D15 is connected to the output of integrated circuit U1 pin 11. The output of integrated circuit U2 pin 3 is connected to the input of integrated circuit U2 pin 5. The brew 25 oz. probe 154 is connected to pin CN1-3.

The output of integrated circuit U1 pin 11 is also connected via diode D14 to the anode of diode D16, also the input of integrated circuit U2 pin 11 and through resistor R13 to ground via resistor R14, also on to the "half" switch located on the control panel 112 via pin CN1-1. As it is described above, the brew fill, level and dispense circuit function as follows. When starting with an empty brew water tank 30, and the "on/off" switch is manually depressed, this energizes the brew fill solenoid valve 80 through relay K2 until the water level reaches the brew fill probe 152, permitting low voltage current to flow through the water to the brew ground probe 160, thus terminating the fill cycle. When the "half" switch is depressed, the brew boiler 50 is energized through relay K3 and boils the water from the tank and dispenses it into the pot or server. When the level has fallen below the brew 25 oz. probe 154, continuity is broken, energizing an appropriate light in the control panel 112. When the water level in the tank reaches the brew 50 oz. probe, continuity is broken, dropping out relay K3, deenergizing the boiler 50. The water is replaced, as described above, for the fill cycle. When the "full" switch is energized, the system functions in the same manner as described for the half cycle, except the boiler 50 continues to operate until the brew 75 oz. probe 158 breaks continuity and shuts down the operation and refills the tank, as above.

The hot water fill and level circuit obtain 6 volt DC power from pin 6V, which is then directed through capacitor C13 to the cathode of diode D43 and to the input of integrated circuit U3 pin 9, also through resistor R60 to the output of integrated circuit U3 pin 11. The input of integrated circuit U3 pin 11 is connected through resistor R56 to the water fill probe 162. The output of integrated circuit U3 pin 9 is connected through resistor R62 to the base of transistor Q11 and, also to the anode of diode D42 and D44. The cathode of diode D44 is connected to the collector of transistor Q3 and, also to the cathode's of diodes D33 and D27. The emitter of transistor Q11 is interconnected to ground through diode D45 and, also to pin CN1-16 through resistor R63. The collector of transistor Q11 feeds the first side of the holding coil for relay K6 and the anode of diode D39. The second side of K6's holding coil receives 12 volt DC power from pin 12V and is, also connected to the cathode of diode D39. Water ground probe 166 is grounded through resistor R57 and capacitor C19 in parallel with resistor R58 and capacitor C20. The water safety probe 164 is connected through resistor R59 to the input of integrated circuit U3 pin 5 and, also the interface of resistor R58 and capacitor C20. The output of integrated circuit U3 pin 5 extends to the cathode of diode D34. Upon start-up, with an empty tank and when replenishing is required, when the "on/off" switch is manually depressed, the water fill solenoid valve 82 is energized until the water level reaches the water fill probe 162. Continuity through the water from the fill probe 162 to the water ground probe 166 terminates the fill cycle. When hot water level in the tank is below the level of the water safety probe 164, continuity is broken between the safety probe 164 and the water ground probe 160, preventing the operation of the heater 72 through diode D34.

The brew water temperature control system receives 6 volt DC from pin 6V and is directed through resistor R44 to one leg of brew thermistor CN2, and the other leg is grounded. The resulting voltage from this intersection is transmitted to the positive input terminal 10 of a quad op amp comparator package U5. The negative input terminal 9 of op amp comparator U5 is connected through resistor R48 to the same 6V power supply pin and ground through resistor R49, allowing a voltage comparison of the two inputs. The output 8 of op amp comparator U5 is connected to the base of transistor Q8 via resistor R52. The output 8 of op amp comparator U5 is, also connected to ground through diode D46 and resistor R51 in series and, also through resistor R53 to both the negative input 13 of op amp comparator U5, and the positive input 10 of the op amp comparator U5. The positive input 12 of op amp comparator U5 is connected to the junction of resistors R46 and R47, with R46 interfacing with 6V DC and R47 interfacing with ground. The output 14 of op amp comparator U5 is connected to the cathode of diode D26 and the anode is directed to the base of transistor Q8, which is also connected in parallel with the anode's of diodes D27, D28 and D29. The emitter of transistor Q8 is unitedly interconnected to the emitter's of transistors Q9, Q10 and Q11. The collector of transistor Q8 is connected to one leg of the holding coil of relay K4, which energizes the brew pre-heater 38, the other leg of the coil is connected to 12V DC through the 12V pin and, also the cathode of diode D25. The anode of diode D25 and cathode of diode D47 is, also connected to the collector of transistor Q8. The anode of diode D47 is connected to the input of integrated circuit 11. The brew water temperature control circuit, as described, provides water within the tank 30 at a pre-set temperature of 150 degrees F. (65.6 degrees C.) by comparing the resistance of thermistor CN2 to the resistance of resistors of known value equivalent to the desired temperature set point. If the temperature falls below this value, the brew pre-heater 38 is energized by transistor Q8 and relay K4 until the set point balances. The pre-heater will cycle on and off, as required, to maintain temperature within a 10 degree F. tolerance.

The hot water temperature control circuit is basically the same as the above described brew water circuit. 6 volt DC is received from pin 6V and is directed through resistor R45 to one leg of hot water thermistor CN3, and the other leg is grounded, the resulting voltage from this intersection is transmitted to the positive input terminal 5 of op amp comparator U5. This same voltage is connected to pin 9 output of integrated circuit U3 through resistor R67. The negative input terminal 6 of op amp comparator U5 is connected to the cathode of diode D46, R51 and potentiometer P1 through resistor R50. The other leg of potentiometer P1 is connected to 6 volt DC through pin 6V. The positive input 5 of op amp comparator U5 is, also interconnected with the negative input 2 of op amp comparator US and, also through resistor R55 to the output 7 of op amp comparator U5. The positive input 3 is connected to the positive input 12 of op amp comparator U5. The output 1 of op amp comparator U5 is attached to the cathode of diode D32. The output 7 of op amp comparator U5 is connected through resistor R54 to the anodes of diodes D32, D33, D34 and D31, as well as the base of transistor Q9. The collector of transistor Q9 is connected to the anode of resistor D30 and one leg of the holding coil of relay K5, which energizes the water heater 72, as the other leg of the coil is connected to 12V dc through the pin 12V and, also to the cathode of diode D30. It will be noted that the cathode of diode D29 is connected to pin CN1-4 and pin 1 output of U2. The hot water temperature control circuit provides water within the tank 70 at a pre-set temperature of 185 degrees F. (85 degrees C.) by comparing the resistance of thermistor CN2 to the resistance of resistors of known value equivalent to the desired temperature set point. If the temperature falls below the value, the water heater 72 is energized by transistor Q9 and relay K5 until the set point balances. The water heater will cycle on and off, as required, to maintain temperature within a 10 degrees F. tolerance of the set point. It will be noted that the set point is adjustable with potentiometer P1 that is mounted on the printed circuit board and functions by varying the input to the comparator U5 network.

The hot water dispense circuit receives 6V DC power through pin CN1-16 and R64 to the base of transistor Q10 and anode of diode D41. The collector of transistor Q10 is connected to one leg of the holding coil of relay K7, which engages the water dispense solenoid valve 74, the other leg of the coil is connected to 12V DC through the 12V pin, also the cathode of diode D40. When hot water is to be dispensed, the user depresses the momentary "hot water" dispense switch connected to pin CD1-16, triggering transistor Q10 and energizing relay K7, which, in turn, energizes the water dispense solenoid valve 74.

The visual and audio indicating circuit is interconnected to the other circuits receiving electrical power during appropriate cyclic functions. A "full" light circuit is conducted through pin CN1-14 via resistor R43 to the collector of transistor Q7. The emitter of transistor Q7 is grounded, and the base is connected through resistor R42 to the output of pin 1 of integrated circuit U3. The anode of diode D23 and cathode of diode D16, along with the input of integrated circuit U2 pin 5, are connected via resistor R41 to the input of integrated circuit U3 pin 1. This "full" light circuit is energized when the "full" switch is depressed and stays on until the brew 75 oz. probe circuit opens, disengaging the boiler and light.

The "half" light circuit is conducted through pin CN1-12 via resistor R38 to the collector of transistor Q6. The emitter of transistor Q6 is grounded, and the base is connected through resistor R37 to the output of pin 3 of integrated circuit U3. The anode of diode D22 and cathode of diode D17, along with the input of integrated circuit U2 pin 9, are connected via resistor R36 to the input of integrated circuit U3 pin 3. This "half" light circuit is energized when the "half" switch is depressed and stays on until the brew 50 oz. probe circuit opens, disengaging the boiler and light.

A flasher circuit is grounded through capacitor C12 to the input of integrated circuit U3 pin 13 and through resistor R33 to the following; the output of integrated circuit U3 pin 13, pin CN-11, through resistor R31 to the base of transistor Q5, through resistor R34 to the input of integrated circuit U3 pin 3, and through resistor R39 to the input of integrated circuit U3 pin 1. The flasher circuit permits specific lights to flash, or cycle, on and off, for indication of the brewing process.

A "on/off" light circuit employs transistor Q5 with the emitter grounded, the collector connected through resistor R32 to pin CN1-10, and the base connected to the anode of diode D24, through resistor R30 to the following: The cathode of diode D18, outlet of integrated circuit U1 pin 1, through resistor R35 to the input of integrated circuit U3 pin 3, and through resistor R40 to the input of integrated circuit U3 pin 1. The "on/off" light circuit energizes the light on the control panel when the enable circuit is energized.

An audio circuit produces an audible beep when any of the manual switches are depressed. 12 volt DC is supplied by pin 12V and is connected by means of R29 to the beeper AT-102 and the cathode of diode D21. Both the anode of diode D21 and the beeper AT-102 are connected to the collector of transistor Q4. The emitter of transistor Q4 is grounded and the base is in communication through resistor R28 to the output of integrated circuit U1 pin 9. The output of integrated circuit U1 pin 9 is, also connected through resistor R27 to the cathode of diode D20 and, also to the input of integrated circuit U1 pin 9. The input of integrated circuit U1 pin 9 is connected through capacitor C8 to the following: Ground, through resistor R25 to pin CN1-7, through resistor R26 to the anode of diode D48 and, also through resistor R65 the input of integrated circuit U1 pin 5. The anode of diode D48 is connected via capacitor C7 and on to pin CN1-7. The output of integrated circuit U1 pin 5 is connected to the anode of diode D20. Pin CN1-7 is, also in electrical communication with cathodes of diodes D12 and D13. The audio circuit is interconnected with all switches with an audible verification of their making contact through each touch pad.

Interconnecting wiring between circuits includes pin CN1-9 connected to the following; output of integrated circuit U1 pin 11, the cathode of diodes D24, D42, D41, D31 and D28. Thermistor CN2 is connected through resistor R66 to the output of integrated circuit U1 pin 3.

Figure 26:
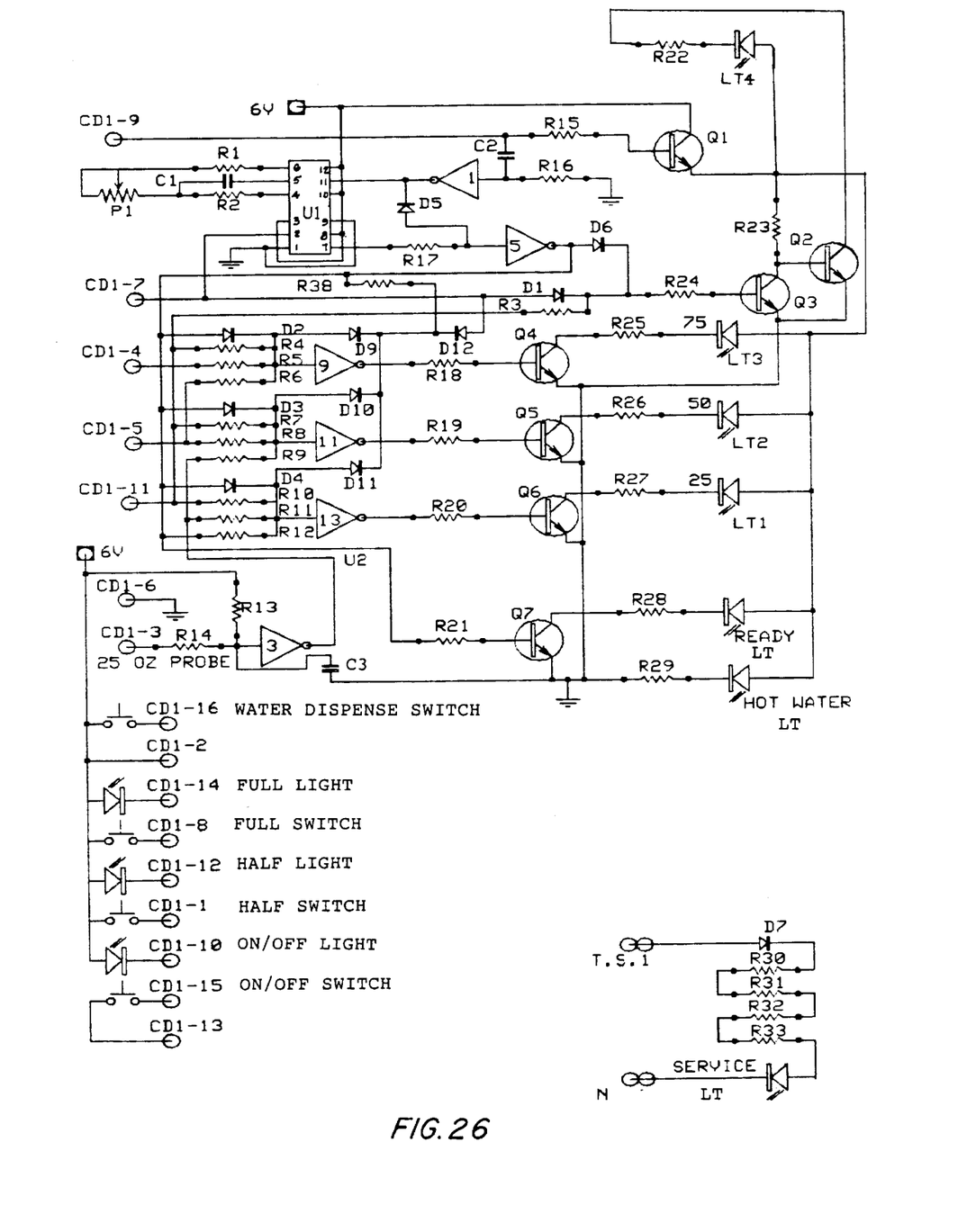
FIG. 26 is an electrical schematic of the indicating control panel.

The electrical schematic for the indicating control panel 112 on the printed circuit board is illustrated in FIG. 26. 6 volt DC from pin CD1-2 supplies positive DC voltage to the following; pin CD1-16 through water dispense switch, pin CD1-14 through "full" LED light, pin CD1-8 through "full" switch, pin CD1-12 through "half" LED light, pin CD1-1 through "half" switch, and pin CD1-10 through "on/off" LED light. Pin CD1-15 is connected through "on/off" switch to pin CD1-13. Each designated pin is connected to the controller 140 through the ribbon cable 168 for interconnection.

The heater and boiler safety circuit connects the three safety switches 76 to pin T.S.1 in series. Pin T.S.1 is connected to the "service" light through diode D7, resistors R30, R32 and R33 in series. The negative side of the light is connected to pin N. Further, pin CD1-6 is grounded.

The light circuit energizes the LED's designated "LT" for the appropriate functional indication. 6 volt DC is supplied to the input of integrated circuit U2 pin 3 from 6V through resistor R13. The input of integrated circuit U2 pin 3 is, also in communication with ground through capacitor C3 and to pin CD1-3 through resistor R14. The output of integrated circuit U2 pin 3 interfaces the input of integrated circuit U2 pin 13 through resistor R11 and, also the input of integrated circuit U2 pin 11 through resistor R9. The base of transistor Q7 is connected through resistor R21 to the following: Through resistor R12 to the input of integrated circuit U2 pin 13, the anode of diodes D4, D3, D2, D6, and R38, also the output of integrated circuit U2 pin 5. The collector of transistor Q7 is attached to "ready" light through resistor R28. The emitter of transistor Q7 is attached to ground. Pin CD1-11 is connected to the cathode of diode D4 and the anode of diode D11, also the input of integrated circuit U2 pin 13 through resistor R10, and the output is connected to the base of transistor Q6 through resistor R20. The emitter of the transistor Q6 is grounded and the collector is connected to the first brew time ladder light LT1. Pin CD1-5 is connected to the input of integrated circuit U2 pin 11 and 9 through resistor R8 and R6, respectfully, and the output of U2 pin 11 is connected to the base of transistor Q5 through resistor R19. The input of integrated circuit U2 pin 11 is, also connected to the cathode of diode D3 and the anode of diode D10. The emitter of the transistor Q5 is grounded and the collector is connected to the second time ladder light LT2. Pin CD1-4 is connected to the cathode of diode D2 and the anode of diode D9, also to the input of integrated circuit U2 pin 9 through resistor R5, and the output is connected to the base of transistor Q4 through resistor R18. The emitter of the transistor Q4 is grounded and the collector is connected to the third brew time ladder light LT3. Pin CD1-7 is connected to pin 2 of timer U1, the anode of diode D12 and through diode D1 via resistor R24 to the base of transistor Q3. The cathode of diode D1 is, also connected to the cathode of diode D6 and through resistor R3 to the following; through resistor R4 to the input of integrated circuit U2 pin 9, through resistor R7 to the input of integrated circuit U2 pin 11, through resistor R10 to the input of integrated circuit U2 pin 13, and pin CD1-11. The collector of transistor Q3 is connected to the base of resistor Q2 and through resistor R23 to the emitter of transistor Q1, also to one side of the light LT4. The other side of light LT4 is connected through resistor R22 to the collector of transistor Q2. The emitter of transistor Q1 is connected to one side of the following lights; LT3, LT2, LT1, "ready" LT and "hot water" LT. The emitters of transistors Q2, Q3 and Q4 are connected together. The collector of transistor Q1 is connected to pin 6V and pins 12, 10, 8 and 3 of timer U1. Pin CD1-9 is connected through resistor R15 to the base of transistor Q1 and, also via capacitor C2 to the input of integrated circuit U2 pin 1 and through resistor R16 to ground. Pin 11 of timer U1 is connected to the output of integrated circuit U2 pin 1 and through diode D5 to the input of integrated circuit U2 pin 5, also through resistor R17 to pin 7 of timer U1. Timer U1 pins 1 and 9 are grounded. Pin 6 of timer U1 is connected via resistor R1 through potentiometer P1 and via resistor R2 to pin 4 of timer U1. Pin 5 of timer U1 is, also connected to the junction of potentiometer P1 and R2 via capacitor C1.

In operation, the apparatus is connected to city water through compression fittings 150 and plugged into city power with power cord 132. A conventional coffee pot 170, as shown in FIG. 3, or a coffee server 172, illustrated in FIGS. 1 and 2 (neither part of the invention), is placed on the base 86 beneath the brew cone 114. When the "on/off" switch is depressed, the fill cycle for both the brew tank 30 and hot water tank 70 begins and continues until each tank is completely filled. The tanks are heated in sequence, first, the brew tank with pre-heater 38, and then water heater 72. Since only one heater may be energized at a particular time due to most building power limitations, i.e. conventional 15 amp circuits priority sequence is imposed, which is boiler 50, pre-heater 38, and then heater 72. When the tanks are up to temperature, the "ready" light is energized. If hot water is desired, the "hot water" switch is depressed and water is dispensed through solenoid 74. If coffee brewing is desired, ground coffee is placed in a filter in the cone 114 sufficient for either a full or half pot. If a half pot is selected, the "half" switch is depressed and the "half" light is energized. The process begins and the bottom light in the ladder sequence is lit and blinks and, as time continues, the next light blinks on and the one beneath is on steady. When brewing is completed, the ready light is energized. If a full pot is required, the same sequence is followed, except the "full" switch is depressed. The light ladder indicates in upward sequence until all of the lights are lit. It will be noted that the top light and ready light are timed and the others are sequenced by the probes. The "service" light is energized when any one of the heater or boiler safety switches open.

These switches are the manually reset type. When any switch is depressed, an audible beep is heard and the appropriate light above the switch is on until the function is completed.

Figure 2:
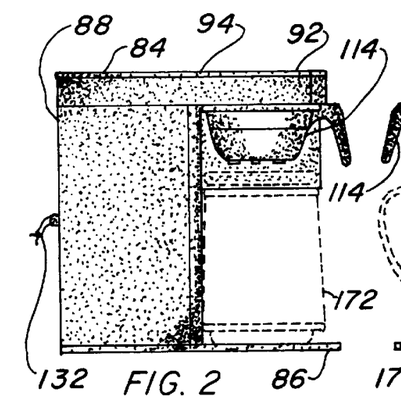
FIG. 2 is a left side view of the invention in its second or low profile embodiment with a vacuum coffee server.
Figures 3, 4:
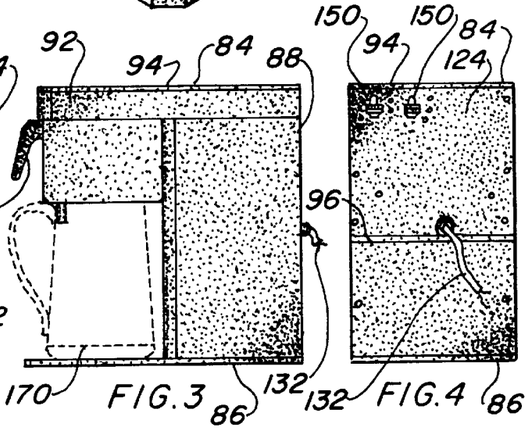
FIG. 3 is a right side view of the invention in its second or low profile embodiment with a vacuum coffee pot.
FIG. 4 is a rear view of the invention in its second or low profile embodiment.

The second embodiment is identical in all respects, except the extension column 90 is omitted and a shorter coffee pot 170 or server 172 is used, as illustrated in FIGS. 2, 3 and 4.

These and other objects and advantages of the present invention will become apparent from the subsequent detailed description of the preferred and other embodiments, also the appended claims, further taken in conjunction with the accompanying drawings.

What is claimed is:

1. A coffee brewer and hot water dispenser apparatus including attached city water and electrical power comprising;
    a brew water tank receiving and storing water from an external source,
    a brew pre-heater in mechanical and fluid communication with said brew water tank for heating and maintaining brew water temperature therein using heat produced by electrical energy,
    a brew boiler in fluid communication with said brew water tank for boiling pre-heated water from the brew tank for coffee brewing using heat produced by electrical power,
    a circular spray head for receiving boiling water from said brew boiler and distributing boiling water evenly over coffee grounds in a uniform parametric manner,
    a hot water tank receiving and storing water from an external source,
    a hot water heater in mechanical and fluid communication with said hot water tank for heating and maintaining water temperature therein using heat produced by electrical power,
    hot water dispensing means fluidly connected to said hot water tank for supplying heated water to an external container for food and beverages, and
    an electronic controller interconnected with an indicating control panel defining means to regulate both brew water and hot water fill, level, temperature and dispensing, also process indicating and selection means, permitting a user to select on/off function, half and full pot brew levels, view brewing progress intervals, viewing when it is safe to remove coffee containing brew cone, viewing heater malfunction and initiate hot water dispensing.

2. The coffee brew and hot water dispenser as recited in claim 1 further comprising a metallic enclosure configured in such a manner as to permit sub-assembly of said brew and hot water tanks, heaters, boiler, hot water dispensing means and electronic controller for invention into said enclosure defining a structural envelope containing said spray head and said indicating control panel.

3. The coffee brew and hot water dispenser as recited in claim 1 wherein said brew and hot water tanks each define a different heated water temperature with water temperature maintained within the hot water tank manually adjustable over a specific range.

4. The coffee brew and hot water dispenser as recited in claim 1 wherein said brew and hot water tanks are vented to atmosphere and of a material other than metal.

5. The coffee brew and hot water dispenser as recited in claim 1 wherein said brew pre-heater, brew boiler and hot water heater each further comprises a heating element defined by an electrical resistance wire housed in a tubular sheath surrounded by refractory material coiled inside a metallic tube with a metallic flat bottom pressed into the tube in a watertight manner for closure and a hermetic seal.

6. The coffee brew and hot water dispenser as recited in claim 1 wherein said brew pre-heater, brew boiler and hot water heater each further comprises a safety switch intimately embracing each heater and boiler external surface for indicating an abnormal overheating condition, permitting shutdown before creating an endangering hazard.

7. The coffee brew and hot water dispenser as recited in claim 1 further comprising a check valve within the fluid communication between the brew boiler and the brew water tank, permitting pre-heated water to enter the boiler and force boiling water into the spray head simultaneously, disallowing boiling water to reenter the brew tank.

8. The coffee brew and hot water dispenser as recited in claim 1 wherein said spray head further comprises an inlet elbow threadably connected to a skirted dish-shaped circular body having a raised ring with a groove therein surrounding ingress of the elbow and a round cone-shaped diverting disc of a diameter less than that of the body, having a plurality of extending fingers snapped over the ring into the groove, leaving a gap for a flowpath between the body and the disc, thereby permitting boiling water to be evenly distributed over the cone disc and flow from the head through a gap between the body and disc in a even and predetermined circular manner.

9. The coffee brew and hot water dispenser as recited in claim 1 further comprising a pair of electromagnetic fill solenoid valves are in fluid communication with the brew water tank, hot water tank and both to city water, to fill the tanks with water and maintain water level therewithin upon demand of the electronic controller.

10. The coffee brew and hot water dispenser as recited in claim 1 wherein said hot water dispensing means further comprises an electromagnetic water dispense solenoid valve in fluid communication with the hot water tank energized by the controller upon a signal from the control panel when an appropriate function is selected by a user.

11. The coffee brew and hot water dispenser as recited in claim 1 wherein said electronic controller further comprises a power supply circuit, an enable circuit, a brew fill and level circuit, a hot water fill and level circuit, a brew water temperature control circuit, a hot water temperature control circuit, a brew water dispensing circuit, hot water dispensing circuit, and visual and audio indicating circuit, each electrically interconnected with the indicating control means.

12. The coffee brew and hot water dispenser as recited in claim 11 further comprising a brew fill probe, a brew 25oz. probe, a brew 50oz. probe, a brew 75oz. probe, and brew ground probe for the brew water fill and level circuit, also a water fill probe, a water safety probe, and a water ground probe for the hot water fill and level circuit, each probe is a metallic rod through which an electrical current is passed from a function probe to the ground probe using water within the tank as a conductor to complete an electrical circuit, thus indicating water level to the electronic controller.

13. The coffee brew and hot water dispenser as recited in claim 11 further comprising a brew thermistor disposed within a well in the brew water tank integral with the brew water temperature control circuit and a water thermistor disposed within a well in the hot water tank integral with the hot water temperature circuit, each thermistor varying resistance with a change in temperature permitting the controller to sense temperature of water within each tank when a current of electricity is passed through each thermistor by actuating the brew pre-heater and water heater as required to maintain a pre-selected water temperature.

14. The coffee brew and hot water dispenser as recited in claim 1 wherein said indicating control panel further comprises a on/off control switch, a half pot control switch, a full pot control switch, and a hot water control switch, along with indicating lights defined by an on light, a half pot light, a full pot light, a plurality of brewing lights, a ready light, a service light, and a hot water light, said switches are touch pad type and said lights are light emitting diodes (LED's), the switches and lights are mounted in a printed circuit board and protrude through the coffee brewer and hot water dispenser apparatus, as to be accessible and visible to an operator.

15. The coffee brew and hot water dispenser as recited in claim 14 further comprising a timing circuit electrically communicating with a ready light such that the light continues illumination for a predetermined time interval.

16. The coffee brew and hot water dispenser as recited in claim 1 further comprising interconnecting tubing of a flexible nature fluidly uniting said tanks to said heaters and boiler, and boiler to said spray head.

17. A coffee brewer and hot water dispenser apparatus including attached city water and electrical power comprising;

brew water storage and heating means for receiving and retaining city water in a heated condition, brew water boiling and dispensing means fluidly connected to said brew water storage and heating means in such a manner as to selectively dispense boiling water for coffee brewing, hot water storage and heating means for receiving and retaining city water in a heated condition, electrically actuated hot water dispensing means fluidly connected to said hot water storage and heating means enabling a user to instantly obtain hot water for food and beverages, and electric control and display means integrated into the brew water means and hot water means permitting dispensing and visual indication of selected processes initiated by a user.

18. The coffee brew and hot water dispenser as recited in claim 17 wherein said brew water and hot water storage means comprise a thermoplastic tank vented to atmosphere and said brew water dispensing means further comprises a spray head defined by an inlet elbow threadably connected to a skirted dish-shaped circular body having a raised ring with a groove therein surrounding ingress of the elbow and a round cone-shaped diverting disc of a diameter less than that of the body, having a plurality of extending fingers snapped over the ring into the groove, leaving a gap for a flowpath between the body and the disc, thereby permitting boiling water to be evenly distributed over the cone disc and flow from the head through a gap between the body and disc in a even and predetermined circular manner.

19. The coffee brew and hot water dispenser as recited in claim 17 further comprising a metallic enclosure configured in such a manner as to permit sub-assembly of the brew water and hot water storage and heating means, brew water boiling and dispensing means, hot water dispensing means, and control means for insertion into the enclosure which incorporates the indication means.

* * * * *